Jan. 2, 1968   H. S. DARVIN   3,360,862
FOOT MEASURING DEVICE
Filed March 18, 1965   4 Sheets-Sheet 1

INVENTOR
HERBERT S. DARVIN

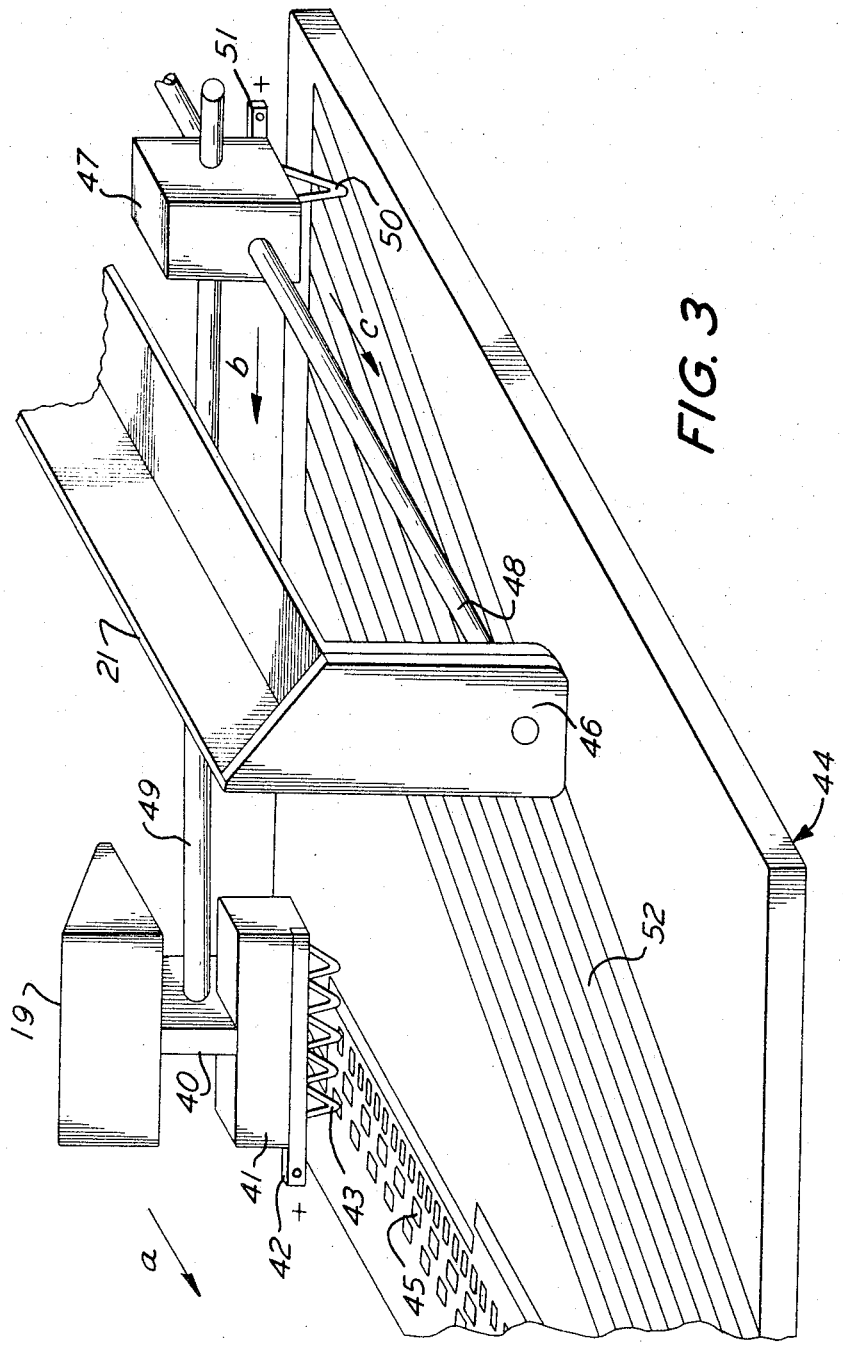

INVENTOR
HERBERT S. DARVIN

Jan. 2, 1968   H. S. DARVIN   3,360,862
FOOT MEASURING DEVICE
Filed March 18, 1965   4 Sheets-Sheet 4

INVENTOR
HERBERT S. DARVIN

United States Patent Office 3,360,862
Patented Jan. 2, 1968

3,360,862
FOOT MEASURING DEVICE
Herbert S. Darvin, 7211 Marshall Road,
Upper Darby, Pa. 19082
Filed Mar. 18, 1965, Ser. No. 440,757
6 Claims. (Cl. 33—3)

ABSTRACT OF THE DISCLOSURE

A device for measuring and exhibiting the length and width of the human foot which comprises a first slidable member adapted to be placed in contact with the end of a foot and a second slidable member associated with the first member and adapted to be placed in contact with the side of the foot. The device also includes an alpha-numeric display means which is adapted to exhibit at a single location the various lengths and widths of a foot and means responsive to the placement of the slidable members for enabling the exhibition in the display means of the specific length and width of the foot measured.

---

This invention relates to a foot measuring device and more particularly is directed to an electronic unit for use in measuring foot sizes and indicating the size measured by means of an electronic alpha-numeric display system, this is an aid in fitting and merchandising proper size shoes.

Several devices are available for measuring the length and width of a human foot for the purpose of fitting and merchandising shoes, however, the applicant is unaware of any which provide a fully satisfactory unit which both accurately measures a foot size and simultaneously gives a visual indication of the size measured which is clearly and concisely apparent to both the customer being fitted and the salesman. All of the known devices are constructed in such a way as to make the visual indication of the size measured difficult or impossible for the customer and/or the salesman to see simultaneous with the measurement operation.

The present invention provides a novel foot measuring device which will both accurately measure the length and width of a human foot and simultaneously give a clear and concise visual display of the size measured to both the customer and the salesman. The unit is electrically powered and is operated by the salesman or the customer, manually bringing length and width slides into contact with the end and side of the foot thereby actuating an electronic alpha-numeric display panel which will give both the customer and salesman a visual display of the size measured.

It is therefore the primary object of the present invention to provide a novel foot measuring device. Another object of the present invention is to provide an electrically operated foot measuring device for use in fitting shoes.

Another object of the present invention is to provide a foot measuring device for giving a clear and concise visual indication of both the length and width of a human foot, simultaneous with the measurement of those dimensions, by means of an electronic alpha-numeric display panel.

These and other objects and advantages of the invention will become more apparent upon reference to the following specifications, claims and appended drawings wherein:

FIGURE 3 is a perspective view which illustrates the moving elements and electrical contacts incorporated in the unit of FIGURE 1.

Figure 1:
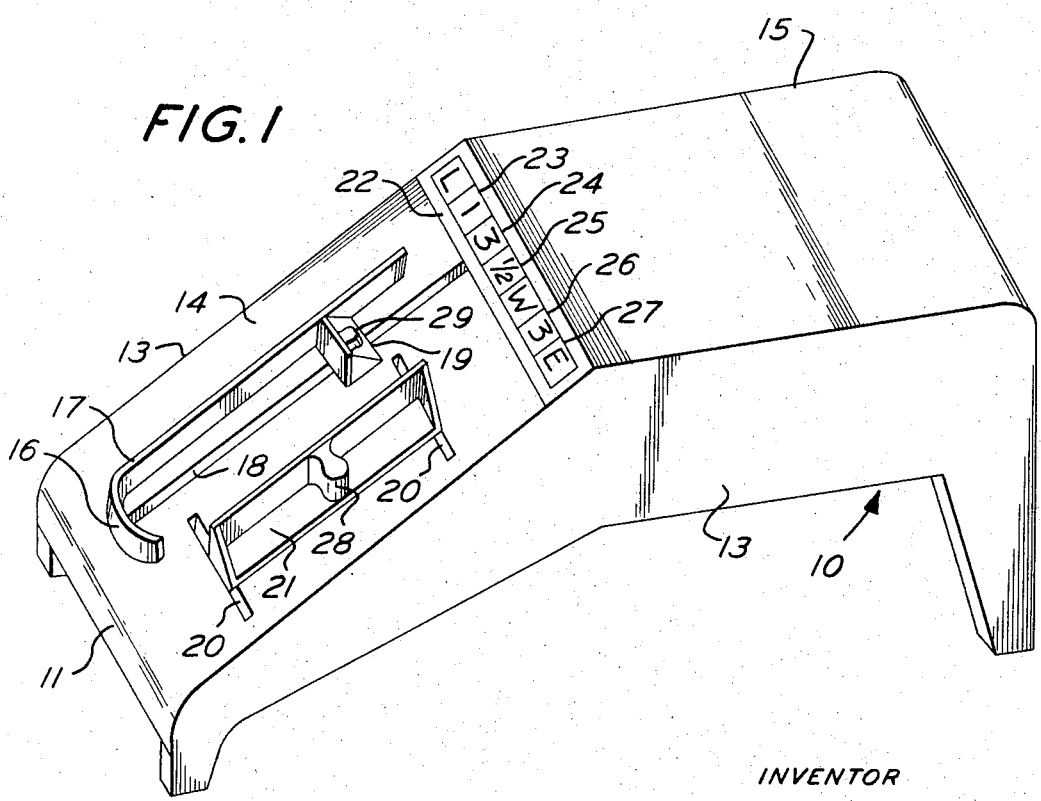
FIGURE 1 shows in perspective, a preferred embodiment of the novel foot measuring device according to the invention.

Referring to the drawings, FIGURE 1 shows a preferred embodiment of the foot measuring device of the present invention generally indicated at 10, comprising a casing 11 including side walls 13, a gradually sloping cover plate 14 and a stool type seat 15. As indicated in the drawing, the casing 11 may be formed with an integral cover plate 14 and side walls 13 to provide a housing for the measuring device. The stool type seat 15 to be constructed in such a way as to provide a comfortable platform on which the shoe salesman may be seated while taking the customer's foot measurements.

Attached to the cover plate 14 is a horizontal abutment 16 which provides a rest for the heel of the foot being measured and also provides the datum line from which the length measurement is taken. At 17 is a vertical abutment which provides a rest for the metatarsal portion of the foot being measured and also provides the datum line from which the width measurement is taken.

Integral to the cover plate 14 is a vertical slide groove 18 which retains and acts as a guide for the length indicating slide 19. Also integral to the cover plate 14 are two horizontal slide grooves 20 which retain and act as guides for the width indicating slide 21.

Generally indicated at 22 is an alpha-numeric display panel having individual displays of sufficient size and brightness to make them clearly and concisely visible to both the customer being fitted and the shoe salesman. This panel is to operate simultaneously with the movement of length indicating slide 19 and width indicating slide 20.

The alpha-numeric display panel 22, is comprised of two sets of displays, the first comprised of three displays at 23, 24, and 25 preceded by the letter "L" and indicates the length measurement. The second set is comprised of the two displays at 26 and 27, preceded by the letter "W" and indicates the width measurement.

The alpha-numeric displays indicated at 23, 24, 25, 26, and 27 may be any of a number of commercially available types such as cold cathode glow discharge, electroluminescent, projected image, electro-mechanical, edge-lighted, spherical optic or others. The prime requirement of the individual display being that it be capable of showing a multiple display in a single window of sufficient size and clarity to make it easily seen by both the customer and shoe salesman.

In the preferred embodiment of the alpha-numeric display panel as shown at 22, individual display 23 is capable of displaying a 0 or a 1. The individual display at 24 is capable of displaying any number from 0 through 9. The individual display at 25 is capable of displaying a ½. The individual display at 26 is capable of displaying the numbers 2 and 3. The individual display at 27 is capable of displaying the letters A through E.

As an example, the measured foot size of 13½ triple E would be displayed as follows: display 23 would show a 1; display 24 would show a 3; display 25 would show a ½; display 26 would show a 3; and display 27 would show an E. The measured size of 3D would be displayed as follows: display 23 would show a 0; display 24 would show a 3;

display 25 would show a blank; display 26 would show a blank; and display 27 would show a D.

In operation the preferred embodiment would operate as follows: The customer whose foot size is to be measured is seated on a chair in front of the shoe measuring device. He then places either foot on the cover plate 14, bringing his heel into contact with the horizontal abutment 16 and the side of his foot into contact with the vertical abutment 17. The shoe salesman, who is seated on the stool seat 15 and facing the customer, then grasps the length slide grip 29 and moves the length indicating slide 19 into contact with the end of the customer's foot. Both the customer and salesman may then read the length measurement indication on the display panel at 22, the salesman reading the panel which is in the inverted position to his view. The salesman then grasps the width slide grip 28 and moves the width indicating slide 21 into contact with the side of the customer's foot. Both customer and salesman may then read the width measurement indication on the display panel at 22.

Figure 2:
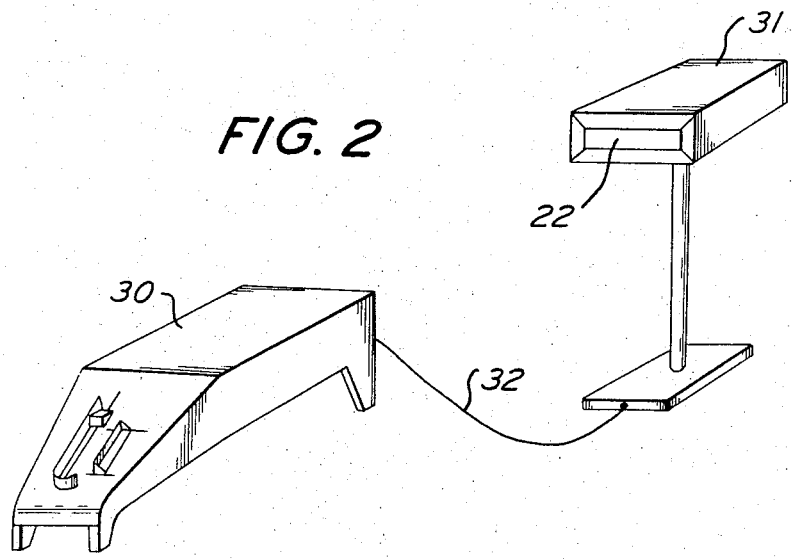
FIGURE 2 is a perspective view of a modified embodiment of the present invention employing an alpha-numeric display isolated from the foot measuring device.

FIGURE 2 is a perspective view of a modified embodiment of the foot measuring device which employs an alpha-numeric display panel isolated from the foot measuring stool. The foot measuring stool generally indicated at 30 is identical to that shown at 10 in FIGURE 1 with one exception, the alpha-numeric display panel indicated at 22 in FIGURE 1 is not integral with the foot measuring stool but is as generally indicated at 22 in FIGURE 2. It is placed in a display stand as generally indicated at 31, and connected to the foot measuring device by electrical conducting wires as indicated at 32. The advantage of this arrangement being that the display stand 31 may be placed in such a position that both the customer and salesman may view the alpha-numeric display right side up, rather than inverted, as is the case for the salesman in using the arrangement as shown in FIGURE 1.

FIGURE 3 is a perspective view which illustrates the moving elements and electrical contacts incorporated in the unit of FIGURE 1 generally shown at 10, with the cover plate 14 removed.

In both FIGURE 3 and FIGURE 1 is a length indicating slide 19 which is comprised of the following parts that are assembled to and move with it as shown in FIGURE 3: A connecting guide bar indicated at 40; a length brush contactor retainer bar 41; a length brush contactor bus bar 42; length brush contactors 43; and a length slide rod 49.

Figure 4:
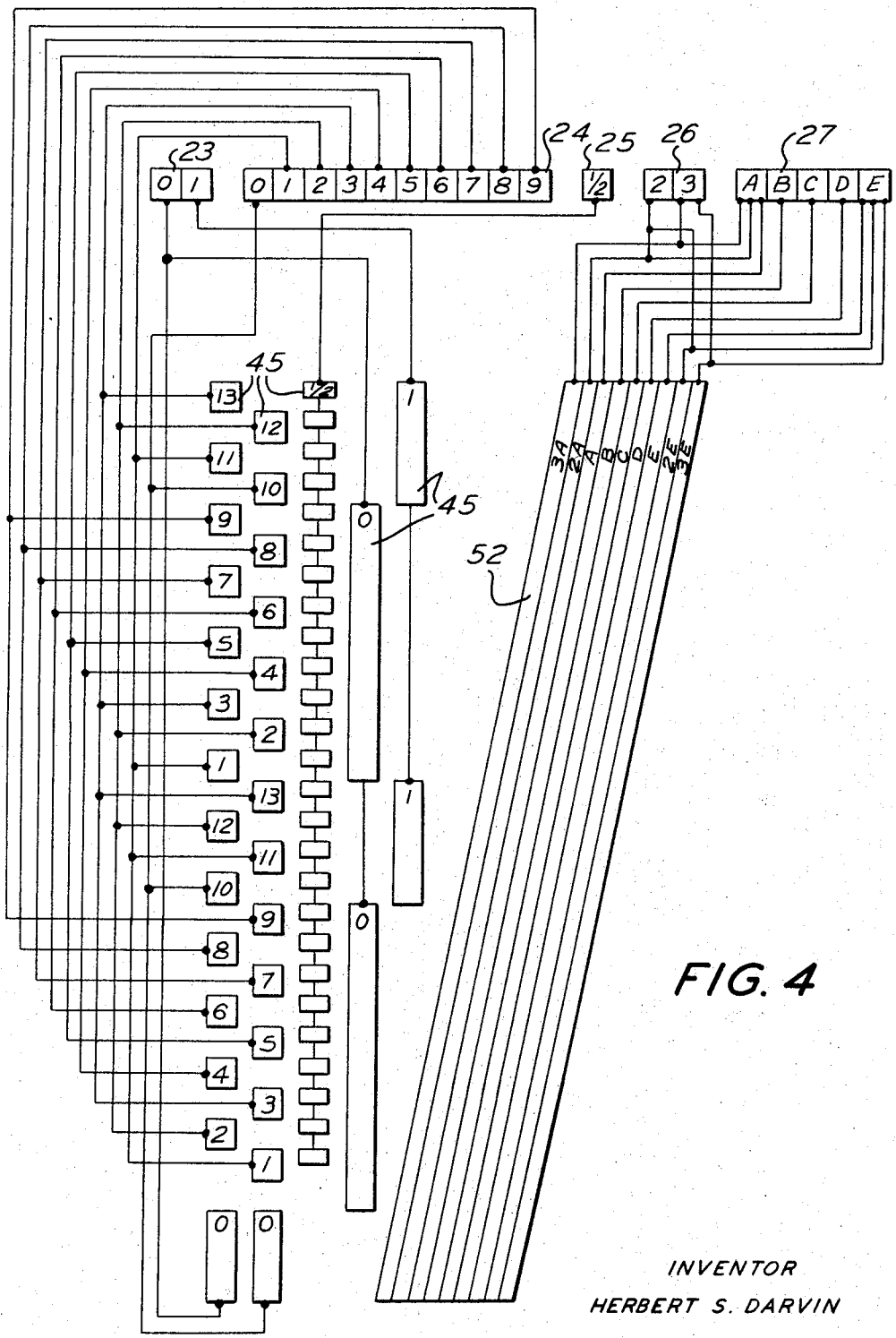
FIGURE 4 is a plan view of the length and width brush contact board and a schematic diagram of the associated circuitry between it and the alpha-numeric display panel.

The length indicating slide 19 is located and retained in the vertical slide groove 18 as shown in FIGURE 1, being retained and guided by the connecting guide bar 40 which slides freely in the groove. In operation the length indicating slide 19 is manually moved down, in the direction of arrow a, the vertical slide groove 18, in FIGURE 1, until it makes contact with the foot being measured. The length brush contactors 43 are spring loaded conductors which are attached to the brush contactor retainer bar 41. They ride on and make contact with the brush contact board as generally indicated at 44. The length brush contactors 43 are designed in such a way that their contact point is in the same plane as the front locating face of the length indicating slide 19. Their electrical power is supplied through the length brush contactor bus bar 42. The length contacts as generally indicated at 45 are embedded in the brush contact board which is made of an insulating material and are spaced in accordance with the standard shoe length dimensions. FIGURE 4 shows a plan view of the brush contact board and the circuit diagram for this portion of the unit.

There is a direct relationship between the width and length dimensions in the measurement of foot sizes. The dimension of a "D" width, for example, being of a greater dimension for a length size 10 than for a length size 6. This fact necessitates the type of construction shown in FIGURE 3 of the width indicating mechanism.

The width indicating slide 21 is located and retained in the two horizontal slide grooves 20 as shown in FIGURE 1 being retained and guided by the width slide end guides, one of the two being shown at 46 in FIGURE 2, which slide freely in the horizontal slide grooves. The width brush contactor retainer block 47 is located and retained by the width slide rod 48 which is permanently fastened at both ends to the width slide end guides 46, and by the length slide rod 49 which is permanently fastened at one end to the connecting guide bar 40. The width brush contactor retainer block 47 is constructed in such a way that it may slide freely in the direction of arrow c, which is parallel to arrow a, on the width slide rod 48 and also slide freely in the direction of arrow b on the length slide rod 49.

The width brush contactor 50 is attached to the width brush contactor retainer block 47 and is located in the same plane as the front locating face of the width indicating slide 21. The electrical power is supplied to the width brush contactor 50 at electrical contact 51. The width brush contactor 50 is spring loaded and rides on the brush contact board 44 making contact with the width brush contacts generally indicated at 52, each of which is insulated one from the other.

In operation the length indicating slide is first manually moved down the vertical slide groove 18 in FIGURE 1, the movement being in the direction of arrow a in FIGURE 3, until it makes contact with the end of the foot being measured. At this point the length brush contactors 43 are making contact with the proper length brush contacts 45 which will complete the required circuits to the length indicating numeric displays at 23, 24, and 25 in FIGURE 1, thus indicating the correct length measurement.

When the length indicating slide 19 is moved, the length slide rod 49, being attached to it, moves with it and in turn moves the width brush contactor retainer block 47 an identical distance along the width slide rod 48 in the direction of arrow c in FIGURE 3. This brings the width brush contactor 50 into the proper relationship between the length and width brush contactors. The width indicating slide 21 is now manually moved along the horizontal slide grooves 20 in FIGURE 1, until it makes contact with the side of the foot being measured. The width brush contactor 50 and width brush contactor retainer block 47, being attached to the length indicating slide 21 through the width slide rod 48, moves with the width indicating slide 21 along the length slide rod 49 in the direction of arrow b. The width brush contactor 50 makes contact with the proper width brush contact 52 completing the required circuits to the width indicating alpha-numeric displays at 26 and 27 in FIGURE 1, thus indicating the correct width.

FIGURE 4 is a plan view of the brush contact board 44 in FIGURE 3 and a schematic diagram of the associated circuitry between it and the alpha-numeric display as shown at 22 in FIGURE 1. The brush contacts at 45 and 52 are labeled in accordance with the foot size measurement to which they correspond. Although the schematic of the alpha-numeric display shows multiple display windows for displays 23, 24, 26, and 27, the actual displays are of the type which makes all displays in a single window as shown in FIGURE 1.

The brush contacts are made of an electrical conducting material and are mounted in a matrix of an insulating material, the contacts thus being insulated from one another, where this is necessary. It is obvious that modifications could be made in the layout of the brush contact board as well as the circuitry as shown in FIGURE 4, and still produce the same end result.

Figure 5:
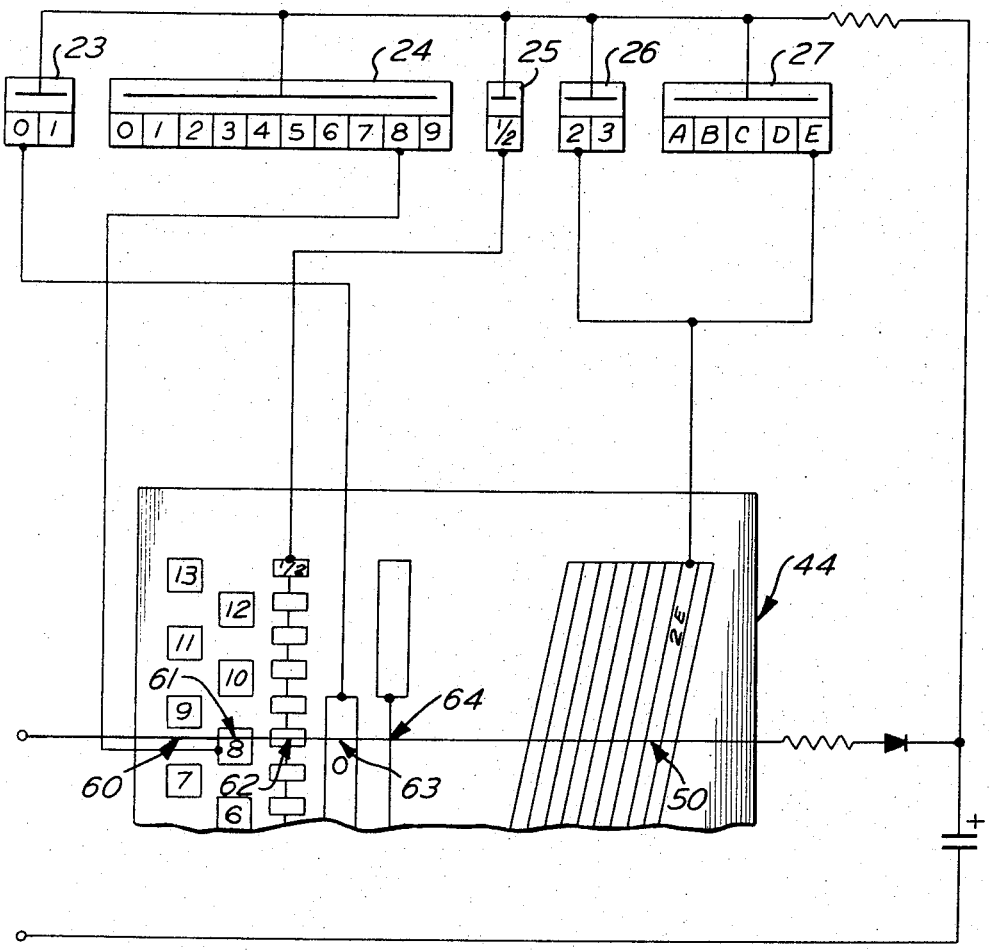
FIGURE 5 is a plan view which illustrates the completed circuits of one size measurement as well as a schematic diagram of the power supply and associated circuitry for one type of alpha-numeric display system.

FIGURE 5 is a view which illustrates a portion of the brush contact board 44, and a schematic diagram of the power supply circuitry for one type of alpha-numeric display system, that of a type of commercially available cold cathode glow discharge tube.

FIGURE 5 also shows the completed circuits which would be made to indicate the measured foot size of 8½, double E. The length brush contactors generally shown at 43 in FIGURE 3 are individually indicated as arrow heads at 60, 61, 62, 63, and 64 in FIGURE 5. The width brush contactor is shown at 50 in both FIGURE 3 and FIGURE 5.

Shown in schematic form are the length indicating numeric displays at 23, 24, and 25, and also the width indicating alpha-numeric displays at 26 and 27.

When the length indicating slide 19 in FIGURE 1 and FIGURE 3, and the width indicating slide 21 in FIGURE 1 and FIGURE 3, make contact with a foot size of 8½ double E the brush contactors 60, 61, 62, 63, 64 and 50 are making contact with the brush contacts, as generally shown at 45 and 52 in FIGURES 3 and 4, as follows: brush contactors 60 and 64 are not making contact therefore no circuit is completed through these points; brush contactor 61 is making contact with the "8" contact thereby completing the circuit to the number "8" in the numeric display 24; brush contactor 62 is making contact with a "½" contact thereby completing the circuit to the number "½" in the numeric display at 25; brush contactor 63 is making contact with the "0" contact bar thereby completing the circuit to the number "0" in display 23; and width brush contactor at 50 is making contact with the "2E" contact bar thereby completing the circuit to the number "2" in display 26 and the letter "E" in display 27.

The purpose of the present invention is to provide a novel foot measuring device for use in the fitting of shoes. The device is of relatively simple design with its electrical power supplied from a standard electrical outlet normally found in any retailing store. The unit is very easily operated and gives an instantaneous visual display of the length and width of the foot being measured. The present invention will therefore provide a novel means of giving a true and accurate foot measurement while at the same time giving a clear and concise visual display of the size measured.

Numerous modifications may be made without departing from the spirit or scope of the present invention. It will be apparent that various modifications may be incorporated into the layout of the brush contact board, its associated circuitry, or the mechanical portion of the unit. Likewise the alpha-numeric displays may be placed in a number of patterns.

The present invention may be embodied in other specific forms without departing from the spirit of the invention and no limitation should be assumed other than those specifically set forth in the claims, the present embodiments being considered in all respects as illustrative and not restrictive.

What is claimed and desired to be secured by United States Letters Patent is:

1. A device for measuring and exhibiting the length and width of a human foot, said device comprising a first slidable member adapted to be placed in contact with the end of a foot and a second slidable member associated with said first member adapted to be placed in contact with the side of a foot, said second slidable member being slidably secured to said first member for transverse sliding with respect to the direction of slidability of said first member and said first member being slidably secured to said second member so that said first member may slide transversely with respect to the direction of slidability of said second member so that a dependent relationship of the width measurement and the length measurement is maintained, a reference member for positioning of the heel and one side of said foot to thereby establish the reference points from which measurements are made, changeable character alpha-numeric display means adapted to exhibit at a single location the various lengths and widths of a foot, and means responsive to the placement of said slidable members for enabling the exhibition in said display means of the specific length and width of the foot being measured.

2. The invention of claim 1 wherein said means responsive to the placement of said slidable members comprises a plurality of electrically conductive contacts placed in a combinatorial pattern adjacent the path of said first slidable member and said first slidable member includes brush contactors adapted to sense various combinations of said contacts in accordance with the position of said first member, said contacts being spaced in accordance with standard shoe size dimensions.

3. The invention of claim 2 wherein said means responsive to the placement of said slidable members further includes a plurality of parallel electrically conductive strips which extend at an angle from said contacts and said second slidable member includes a brush contactor for selectively contacting one of said strips.

4. The invention of claim 1 wherein said alpha-numeric display means is built in an integral unit with said slidable members.

5. The invention of claim 1 wherein said alpha-numeric display means is built into a unit separate from the unit built for said slidable members.

6. The invention of claim 1 wherein said alpha-numeric display continually provides an indication of the position of said slidable members, said alpha-numeric display being of a size sufficient to make a visual indication clearly apparent to both a customer being fitted and a shoe salesman.

References Cited

UNITED STATES PATENTS

| | | | |
|---|---|---|---|
| 1,488,068 | 3/1924 | Schwartz | 33—3.4 |
| 2,251,825 | 8/1941 | Fitzpatrick et al. | 33—3.4 |
| 2,657,463 | 11/1953 | Spencer | 33—3.6 |
| 3,164,819 | 1/1965 | Rantsch et al. | 340—212 |
| 3,192,627 | 7/1965 | Levitt et al. | 33—3.6 |

ROBERT B. HULL, *Primary Examiner.*

LEONARD FORMAN, *Examiner.*

L. ANDERSON, *Assistant Examiner.*